United States Patent [19]
Highland et al.

[11] Patent Number: 5,970,134
[45] Date of Patent: Oct. 19, 1999

[54] SYSTEM AND METHOD FOR MONITORING CALLS PARKED ON AN AUTOMATIC CALL DISTRIBUTOR

[75] Inventors: Glenn E. Highland, Marion; Sarah A. Miller, Cedar Rapids; Laura Mikota, Walker, all of Iowa

[73] Assignee: MCI Communications Corporation, Washington, D.C.

[21] Appl. No.: 08/805,520

[22] Filed: Feb. 26, 1997

[51] Int. Cl.⁶ .............................. H04M 3/00; H04M 7/00
[52] U.S. Cl. ..................... 379/265; 379/266; 379/309; 379/219
[58] Field of Search ...................... 379/265, 266, 379/267, 210, 211, 212, 309, 209, 219, 220, 225, 242

[56] References Cited

U.S. PATENT DOCUMENTS

| | | | |
|---|---|---|---|
| 5,271,058 | 12/1993 | Andrews et al. | 379/265 |
| 5,299,260 | 3/1994 | Shaio | 379/210 |
| 5,528,678 | 6/1996 | Kaplan | 379/230 |
| 5,590,186 | 12/1996 | Liao et al. | 379/201 |
| 5,703,935 | 12/1997 | Raissyan et al. | 379/211 |

*Primary Examiner*—Harry S. Hong
*Assistant Examiner*—Benny Q. Tieu

[57] ABSTRACT

System and method for monitoring calls parked on one or more automatic call distributors (ACDs). Calls parked on an ACD are monitored through the use of a call park server that maintains a relational database. The relational database includes a call-leg information table and a method table. The call-leg information table is used to track and maintain the status of each call-leg parked on an ACD. The method table includes pre-determined methods that can be executed in response to a change in status of the parked call-legs. The method table provides a suite of methods that can be selected by a parking facility, for example, an automated response unit or an operator console, to be applied to the parked call-leg when particular events occur.

27 Claims, 9 Drawing Sheets

5,970,134

SYSTEM AND METHOD FOR MONITORING CALLS PARKED ON AN AUTOMATIC CALL DISTRIBUTOR

BACKGROUND OF THE INVENTION

1. Field of the Invention

The present invention relates generally to computer telephony. More particularly, the present invention relates to parked calls. Still more particularly, the present invention relates to calls parked on an automatic call distributor.

2. Related Art

Call centers have become a popular means for providing operator and customer services for businesses. A call center is typically a platform and location used by a business for customer services, operator services, telemarketing, or other such purposes. A call center is a focal point for receiving customer telephone calls and for providing services. A service may be operator services provided by a telephone company for special feature calls, or customer services provided by a manufacturing company for a product they offer, or customer services provided by a catalog company for placing orders. Callers commonly access a call center by dialing a "1-800" number, though any type of telephone number may be used.

A call center is typically made up of one or more operator consoles, and one or more automated response units. An operator console is a work station staffed by one or more agents or human operators to provide live service and assistance to a caller. An automated response unit services the call in an automated fashion. A call center also typically includes an automatic call distributor (ACD) that is used to receive, queue and distribute calls among the various operator consoles and automated response units.

When a call comes into a call center, the ACD offers the call to an available operator console or automated response unit for servicing. When the call is transferred to a receiving facility, such as an operator console or automated response unit, the receiving facility has responsibility for the call, and a voice channel is established with the receiving facility. During the course of servicing a call, the need often arises to "park" a call on the ACD. When a call is parked on the ACD, the call is active, i.e., there is a party on the call with an established voice channel connected to the ACD. The call is monitored and maintained at the ACD. Once a call is parked at the ACD, it is no longer under control of the facility, i.e., the operator console or automated response unit, that parked the call. This allows the parking facility to be freed up to perform other tasks or services. A parked call should be distinguished from a call placed "on-hold" by an operator console or automated response unit. In the on-hold situation, the facility retains control of the call, and the voice channel is still connected to the facility where the call is on-hold.

While a call is parked at the ACD, the ACD monitors the call to detect a change in its status. For example, the caller may hang up, or the caller may enter a dual-tone multiple frequency (DTMF) signal by pressing a key on the keypad. In a conventional system, the ACD does not act on the state changes unless it receives inactions from the parking facility, such as an automated response unit or an operator console. In a conventional system, each automated response unit and operator console must be individually programmed to initiate an action or carry out a method in response to the changes in the status of a call parked on an ACD. Additionally, any time a new method or a new type of call status change is to be incorporated, each automated response unit or operator console must be modified to include such changes. This involves extensive development, testing, and implementation, for each new change or addition. The associated cost, time, and effort involved are significant.

Thus, there is a need in the art for a simple and cost effective method for monitoring the status of calls parked on an ACD, and for executing various methods in response to a change in status. There is a further need in the art for a system that can easily and cost effectively accommodate new methods to be executed in response to a change in status of a call parked on an automatic call distributor. There is a further need for a system that can accommodate the need for customized methods to be executed in response to a change in status of a call parked on an automatic call distributor.

SUMMARY OF THE INVENTION

The present invention is directed to a system and method for monitoring calls parked on automatic call distributors. In one aspect of the present invention, a method or process for monitoring calls parked on one or more automatic call distributors, each parked call having at least one parked call-leg, is provided. The process comprises: maintaining a call-leg information table, wherein the call-leg information table includes a record for each of the parked call-legs; determining when a change in status has occurred for the parked call-leg; determining whether the change in status requires a method to be executed; and if the change in status requires a method to be executed, then executing the method. The method can also comprise maintaining a method table of pre-determined methods that can be executed in response to the change in status of parked call-legs.

In a further aspect of the present invention, each of the records in the call-leg information table comprises one or more of the following: a call identifier for a parked call-leg; an automatic call distributor (ACD) identifier for an ACD on which the parked call-leg is parked; a method identifier for identifying a method to be executed in response to a corresponding change in status of the parked call-leg, wherein the method identifier identifies one of the methods in a method table; a terminal identifier for identifying a facility that parked the parked call-leg; a flag identifying the parked call-leg as an originating call-leg or a terminating call-leg; and a time-out limit for defining how long the parked call-leg can remain parked at the ACD.

In yet a further aspect of the present invention, a system for monitoring calls parked on one or more automatic call distributors, each parked call having at least one parked call-leg, is provided. The system comprises: call-leg table means for maintaining a call-leg information table, wherein the call-leg information table includes a record for each of the parked call-legs; method table means for maintaining a method table of pre-determined methods that can be executed in response to the change in status of parked call-legs; status change means for determining when a change in status has occurred for the parked call-legs, and for determining whether the change in status requires a method to be executed; and method executing means for executing the method if the change in status requires the method to be executed. In a further aspect of the present invention, the method executing means comprises sequence means for controlling execution of a sequence of methods on a parked call-leg, the sequence of methods corresponding to a sequence of events that change the status of the parked call-leg. The sequence means ensures that the sequence of methods is executed in an order that is the same as an order of occurrence of the sequence of events.

In still a further aspect of the present invention, a computer program product is provided that comprises a computer-usable medium having computer program logic recorded thereon for enabling a processor in a computer system to monitor calls parked on one or more automatic call distributors, each parked call having at least one parked call-leg. The computer program logic comprises database means for enabling the processor to maintain a database. The database comprises a call-leg information table that includes a record for each of the parked call-legs. The database also comprises a method table of pre-determined methods that can be executed in response to a change in status of the parked call-legs. The computer program logic also comprises method executing means for enabling the processor to execute methods in response to changes in status of parked call-legs.

Features and Advantages

It is a feature of the present invention that it maintains a call park server database that includes the status of call-legs parked on one or more automatic call distributors.

It is a further feature of the present invention that it determines when a change in status occurs on call-legs parked on automatic call distributors, and executes the appropriate method, if any, in response to that change in status.

It is yet a further feature of the present invention that it maintains a call park server database that includes a method table of pre-determined methods that can be carried out in response to a change in status of a parked call-leg.

A still furthers feature of the present invention is that it sequences the execution of methods so that they are carried out in the same order as the corresponding events that result in the change in status of the parked call-legs.

A still further feature of the present invention is that it accommodates a primary and secondary architecture to facilitate data-redundancy and fail-over handling. The present invention maintains a call park server database on a primary and on a secondary call park server, but only executes methods if a primary call park server flag is set.

An advantage of the present invention is that it can simply and cost effectively monitor the status of calls parked on one or more automatic call distributors and execute methods in response to status changes of the parked call-legs.

A further advantage of the present invention is that a parking facility can "program" the call park server by selecting methods from the method table and instructing the call park server what methods, if any, get executed in response to various changes in status of parked call-legs.

A still further advantage of the present invention is that new methods can be easily incorporated by adding them to the method table.

A still further advantage of the present invention is that customized methods specific to a particular parking facility can also be incorporated into the method table.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

The present invention is directed to a system and method for monitoring calls parked on one or more automatic call distributors (ACDs). An ACD is used to receive, queue, and distribute calls to operator consoles and automated response units (ARUs) in a typical call center. When a call is received by an ACD, it is offered to an ARU or operator console for servicing. Such servicing can require that the call be parked at the ACD. The present invention monitors calls parked on the ACD through use of a call park server (CPS) that maintains a relational database. The relational database comprises a call-leg information table and a method table. The call-leg information table includes a record for each parked calling. The call-leg information table is used to track and maintain the status of each parked call-leg. The method table includes pre-determined methods that can be executed in response to a change in status of the parked call-legs. The method table provides a suite of methods that can be selected by the parking facility, i.e., the ARU or operator console, to be applied to the parked call-leg when particular events occur.

When an event occurs that changes the status of a parked call-leg, a message in the form of an UPDATE request is sent to the call park server. The call park server queries the call-leg information table to determine what method, if any, is to be executed in response to the change in status that has occurred. If a method is to be executed, then the call park server executes the appropriate method. The method is accessed in the method table through the use of short and simple designators. The methods can include, for example, the application of treatment to the call by the ACD. In this manner, the present invention provides a simple and cost-effective method for monitoring the status of calls parked on an ACD, and for executing various methods in response to a change in status.

Operation of the Present Invention

Figure 1:
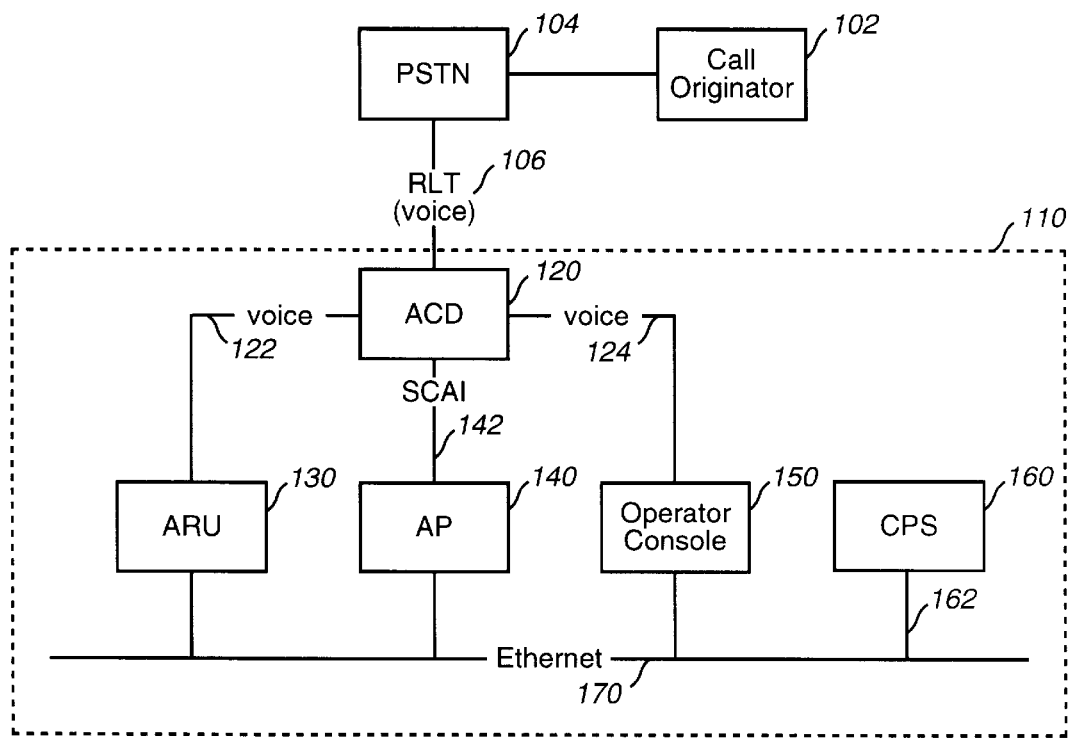
FIG. 1 shows a block diagram of one embodiment of a call center.

With reference now to FIG. 1, a block diagram of one embodiment of a call center 110 is shown. Call center 110 is used to provide customer and operator services. A call originator 102 accesses call center 110 via a public switched telephone network (PSTN) 104. An automatic call distributor (ACD) 120 in call center 110 receives the call from PSTN 104 via a release line trunk (RLT) 106. As will be readily apparent to one of skill in the relevant art, RLT 106 is provided by various digital switches in the telecommunications industry, and is commonly used to link automatic call distributors at call centers with switches in the PSTN.

When ACD 120 receives a call, it is distributed to an automated response unit (ARU) 130 or an operator console 150. ARU 130 is connected to ACD 120 via a voice line 122. Operator console 150 is connected to ACD 120 via a voice line 124. Call distribution from ACD 120 to ARU 130 and operator console 150 is determined by an applications processor (AP) 140. AP 140 is a computer adjunct to ACD 120. AP 140 is used to perform call processing functions for ACD 120. The use of AP 140 allows ACD 120 to be dedicated to switching, thereby increasing the call capacity of ACD 120. AP 140 determines where a particular call should be routed based upon a variety of criteria, for example, the number dialed by call originator 102, the telephone number from which call originator 102 is placing the call, etc. AP 140 communicates with ACD 120 via a computer applications interface link 142.

Although call center 110 shown in FIG. 1 is configured with one ARU 130 and one operator console 150, call centers typically have a plurality of automated response units and a plurality of operator consoles. Each ARU 130 will generally be configured to perform the same service applications as operator console 150, but in an automated manner. Each operator console 150 is staffed with live operators.

Communication between ARU 130, AP 140, and operator console 150 is via a common network, for example, an Ethernet network 170 as shown in FIG. 1. Various functions are performed using network 170. For example, when AP 140 receives a query for call routing from ACD 120, it uses network 170 to determine which operator console or ARU is available to take the call. In order for AP 140 to track operator console and ARU availability, operator console 150 and ARU 130 use network 170 to inform AP 140 when it has completed processing a call. Network 170 is also used by an operator console to query an ARU for call context information when a call is transferred from an ARU to the operator console. It should be understood that networks other than an Ethernet network can be used to perform the functions of network 170. For example, a DECNET network, available from Digital Equipment Corporation, can also be used.

FIG. 1 shows a typical architecture of a call center. It should be understood that the present invention is not limited to the call center architecture shown in FIG. 1, and can be used with other call center architectures.

FIG. 1 also shows a call park server (CPS) 160 of the present invention in call center 110. Call park server 160 monitors calls parked on ACD 120 by maintaining a relational database. Information regarding the status of calls parked on ACD 120 is sent to call park server 160 by AP 140 via network 170. Call park server 160 communicates with network 170 via a communications link 162. Communications link 162 is preferably a TCP/IP communications link. As will be readily apparent to one of skill in the relevant art, a TCP/IP communications link is a transmission control protocol/Internet protocol communications link. Transmission control protocol is the major transport layer protocol in Internet that provides reliable virtual connectivity for communication between two Internet nodes. Internet protocol is the network-layer protocol that primarily provides for handling the Internet address. Upon recognizing the IP address of the resident host, the IP layer passes the data packet to the transport layer on the resident host.

Figure 2:
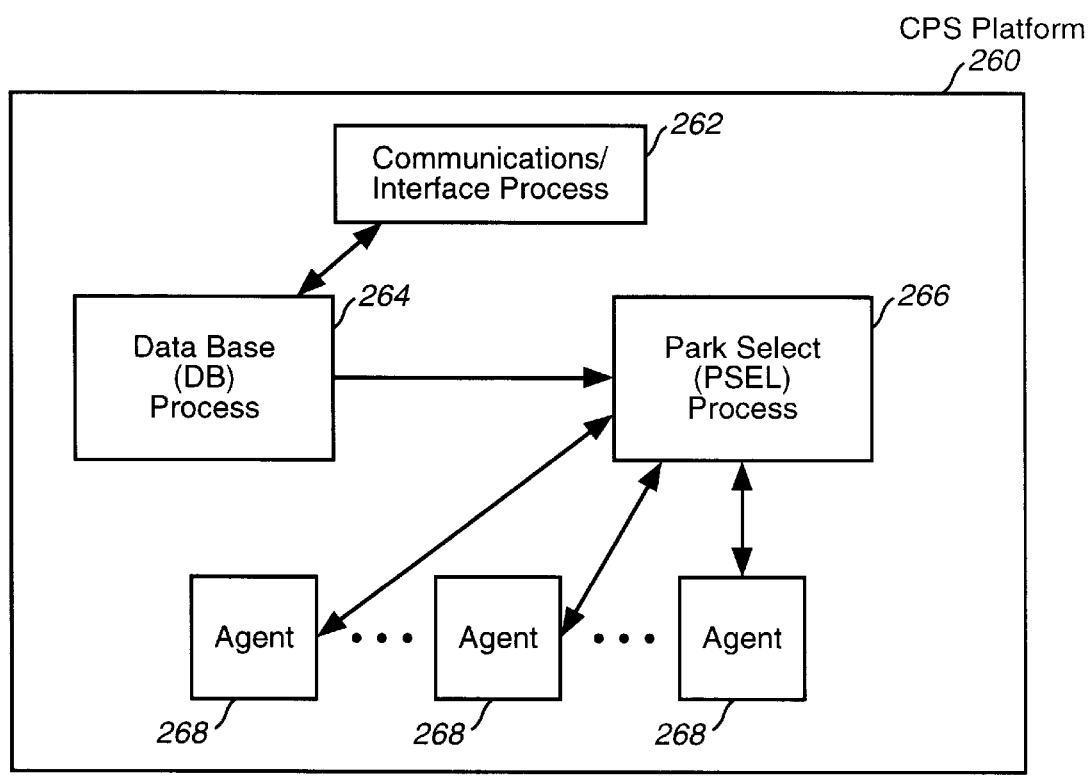
FIG. 2 shows a block diagram of one embodiment of a call-park server (CPS) platform of the present invention.

The functions of call park server 160 are carried out through use of a call park server platform 260, as shown in FIG. 2. Call park server platform 260 comprises a plurality of processes or software modules that are used to carry out the functions of call park server 160.

A communications/interface process 262 provides for external communications between CPS platform 260 and an external agency such as AP 140. Communications/interface process 262 also provides for internal communications within call park server platform 260. External communications are preferably carried out by communications/interface process 262 by providing a UDP/IP communications interface for call park server platform 260. As known to one of skill in the relevant art, a UDP/IP interface is a user datagram protocol/Internet protocol interface. The user datagram protocol is a connectionless Internet user protocol, wherein a packet or datagram is sent to a specific IP address and port number. If a facility or agency is monitoring that specific IP address and port number, then the packet or datagram is received; otherwise, the packet or datagram is lost. The user datagram protocol does not require that a connection be first established with the sending facility or agency, as in TCP/IP protocol. Call park server database change requests and queries can be received through the UDP/IP interface provided by communications/interface process 262. Likewise, any responses required by the requesting agency can be also sent via UDP/IP.

Communications/interface process 262 also provides for local or internal communication within call park server platform 260. For example, communications/interface process 262 communicates locally with a database (DB) process 264. Such internal communication with DB process 264 is preferably carried out through the use of an inter-process communication manager. A particularly preferred inter-process communication manager (IPC manager) is disclosed and described in co-pending application Ser. No. 08/671, 027, filed Jun. 25, 1996, the entirety of which is incorporated herein by reference.

Figure 3:
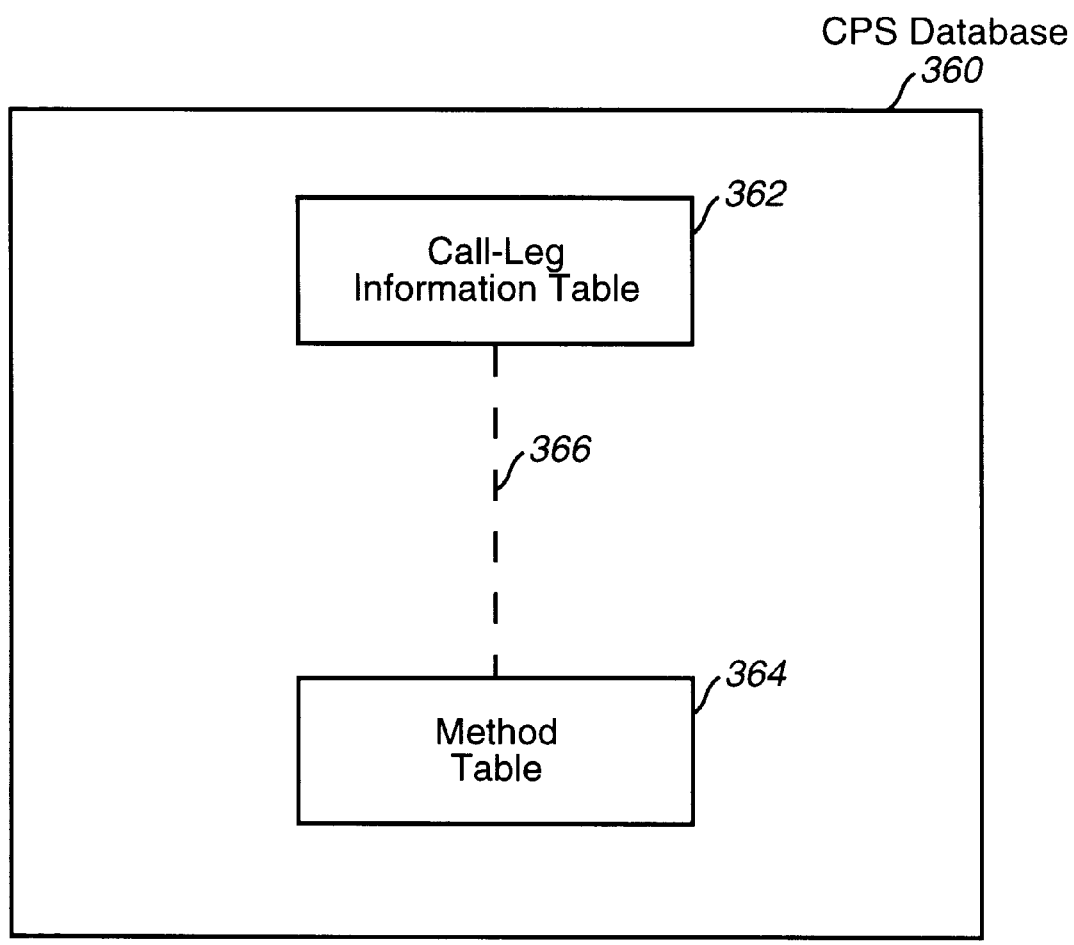
FIG. 3 shows a block diagram of one embodiment of a call-park server (CPS) database of the present invention.

DB process 264 functions as the custodian for a call park server (CPS) database 360 (see FIG. 3). DB process 264 exclusively expedites all changes to CPS database 360 (adds, updates, and deletes, as explained more fully below). DB process 264 also services queries executed against CPS database 360.

DB process 264 provides instructions to a park select (PSEL) process 266. PSEL process 266 functions as a manager for a series of agent processes or tasks 268 that carry out the methods to be applied to the parked call-legs. PSEL process 266 is responsible for assigning methods to agent processes 268 in order to service changes in the status of parked call-legs. PSEL process 266 sequences or controls the execution of methods by agent processes 268 so that the methods are carried out in the same order as the corresponding events that result in the change in status of the parked call-legs.

Each of the foregoing processes of CPS platform 260 will be described in more detail below.

FIG. 3 shows a block diagram of one embodiment of CPS database 360. CPS database 360 comprises a call-leg information table 362 and a method table 364. CPS database 360 is preferably a relational database so that call-leg information table 362 and method table 364 can be linked, as shown by a dashed line 366 in FIG. 3. Although FIG. 3 shows only two tables in CPS database 360, the present invention is not limited to this embodiment. Additional tables or other information can be included in CPS database 360. For example, CPS database 360 can also include a transfer information table to provide a non-volatile repository for transfer records. Such transfer records would be used in the event that a call-leg parked by an ARU or operator console is transferred by CPS platform 260 to another ARU or operator console facility. Such a transfer information table could be provided so that the parking facility could deposit a transfer record for later access by the recipient facility of the call-leg at the time that the call-leg is transferred by the call park server.

The purpose of call-leg information table 362 is to store information on call-legs currently parked on ACD 120. The contents of call-leg information table 362 are volatile and transient as the records stored in the table are likely to be added, updated, and deleted on a very frequent basis due to the dynamics of call-processing traffic. Each record (row) within call-leg information table 362 preferably relates to one and only one parked call-leg. The information contained in each record of call-leg information table 362 is designed to allow the processes of CPS platform 260 to take the appropriate action when a change occurs in the status of the call-leg. This includes all of the information required by CPS platform 260 to manipulate the parked call-legs, such as to perform retrieve, transfer, and release operations, and any other functions called for in the method definitions. The foregoing functions and method definitions will be explained in more detail below.

Each record in call-leg information table 362 preferably comprises data fields that incorporate the following information:

1. call identifier (CID) of the parked call-leg;
2. designation of which ACD maintains the parked call-leg;
3. terminal identifier (TID) of the facility that parked the call-leg;
4. a transfer agent group to which CPS platform 260 is to transfer the call if necessary;
5. data fields necessary to transfer the call, as well as to provide a facility-to-facility message to prompt a facility to retrieve a parked call-leg;
6. indicators that specify what methods are to be executed by call-park server platform 260 when various status changes occur on the parked call-leg at the ACD;
7. a flag indicating that the parked call-leg is either an originating call-leg or a terminating call-leg; and
8. a time-out limit that defines how long a call-leg can remain parked at the ACD.

Each of these items will now be explained in more detail. Taken together, items 1 and 2 serve as the primary key for call-leg information table 362, because these two items together uniquely identify each individual record stored in the table.

Item 1. The CID of the parked call-leg may be based on the telephone number of call originator 102, the dialed number, the ACD port to which the call has been routed, or any other suitable identifier. In a preferred embodiment, the CID is an integer value in call-leg information table 362.

Item 2. The ACD identifier identifies which ACD maintains the parked call-leg. As will be explained in more detail below with respect to FIGS. 4 and 5, a single call-park server 160 may support multiple ACDs. In a preferred embodiment, the ACD identifier is a site abbreviation that indicates the geographical location for the ACD at which the call-leg is parked.

Item 3. The TID identifies the specific ARU or operator console that parked the call-leg. In a preferred embodiment, the TID is an integer value that represents the identifier assigned to an ARU port or an operator console.

Item 4. The TIDs that correspond to ARUs and operator consoles are grouped together into agent groups, each agent group having an agent group identifier or agent group ID. If a call is to be transferred, it will be transferred to another ARU or operator console within an agent group. When the call is actually transferred, CPS platform 260 will instruct ACD 120 to transfer the call to another ARU or operator console within the agent group having the agent group ID specified in the call-leg information table.

Item 5. In order to transfer a call, call park server platform 260 needs sufficient information to instruct the ACD to effect the call transfer. This information is provided by the facility (ARU or operator console) that initially parks the call-leg. In some situations, it is necessary to instruct a parking facility to retrieve the parked call-leg. This can be carried out in the present invention through the use of an UNPARK function. The UNPARK function is carried out when the parking facility that parked the call-leg needs to be notified or reminded that it has to retrieve the parked call-leg and act on it. When an agent process 268 comes across the UNPARK instruction token in its method instructions, a message is sent to the parking facility that parked the call-leg to retrieve the parked call-leg.

Item 6. This item is the key by which the parking facility specifies what methods, if any, are carried out when an event occurs that changes the state or status of a parked call-leg. This information will include an indicator of the event or status change for the parked call-leg, along with a method identifier (to be explained more fully below) that indicates the method or methods to be carried out in response to the corresponding change in status of the parked call-leg.

Item 7. This item is a flag that indicates whether the parked call-leg is an originating call-leg or a terminating call-leg. In a preferred embodiment, a value of 0 (zero) indicates an originating call-leg, and a value of 1 (one) indicates a terminating call-leg.

Item 8. A time-out limit is provided that defines how long a parked call-leg can remain parked. In a preferred embodiment, the time-out limit is specified by minutes and seconds. In the process of the present invention, the expiration of the time-out limit is treated as a change in status of a parked call-leg.

Method table 364 stores the definitions for the various methods that are carried out in response to status changes on a parked call-leg. Each method is a set of instructions in the form of character strings that agent processes 268 interpret to carry out the specified method. The methods are the instructions that agent processes 268 follow to process a parked call-leg when the ACD on which the call-leg is parked detects a change in status, such as a time-out, for that call-leg.

Each record (row) in method table 364 relates to one and only one pre-determined method. The methods themselves are identified by a unique method identifier (method ID). In a preferred embodiment, the method ID commences with the capital letter "M" followed by at least one, and at most two, alphanumeric characters. The instructions for each method ID are listed in the form of an ASCII text string composed of a limited set of string tokens, some followed by numeric arguments. The method ID serves as the primary key to method table 364, and uniquely identifies each individual record in method table 364. The method ID provides the relational link in CPS database 360 between call-leg information table 362 and method table 364.

In a preferred embodiment, each method instruction is comprised of an ASCII text string constructed from a set of string tokens, some of which may be followed by numeric arguments. The following are some examples of instruction tokens.

| | |
|---|---|
| TOKEN: | <DEL> |
| ARGUMENT: | None |
| EXAMPLE: | <DEL> |
| DESCRIPTION: | Request that DB Process 264 delete the call-leg's record from call-leg information table 362. |
| TOKEN: | <IFC> |
| ARGUMENT: | DTMF digit string (numbers, "*", or "#") |

| | | |
|---|---|---|
| EXAMPLE: | <IFC>99; <IFC># | |
| DESCRIPTION: | Check that the last collected digit sequence matches the argument. If no match, abort the method execution; otherwise continue with the method execution. | |
| TOKEN: | <IFM> | |
| ARGUMENT: | DTMF digit string (numbers, "*", "#") | |
| EXAMPLE: | <IFM>*66 | |
| DESCRIPTION: | Check that the last monitored digit sequence matches the argument. If no match, abort the method execution; otherwise continue with the method execution. | |
| TOKEN: | <TAU> | |
| ARGUMENT: | None | |
| EXAMPLE: | <TAU> | |
| DESCRIPTION: | Applying audio treatment to the parked call-leg. In a preferred embodiment, the record for the parked call-leg will also include an audio treatment number that specifies what audio treatment is to be applied via this instruction token. | |
| TOKEN: | <TSI> | |
| ARGUMENT: | None | |
| EXAMPLE: | <TSI> | |
| DESCRIPTION: | Apply silence treatment to parked call-leg. | |
| TOKEN: | <TTO> | |
| ARGUMENT: | None | |
| EXAMPLE: | <TTO> | |
| DESCRIPTION: | Apply tone treatment to parked call-leg. | |
| TOKEN: | <WAI> | |
| ARGUMENT: | Number of seconds to delay | |
| EXAMPLE: | <WAI> 10 | |
| DESCRIPTION: | Delay for the specified number of seconds before continuing with the method. | |
| TOKEN: | <STR> | |
| ARGUMENT: | None | |
| EXAMPLE: | <STR> | |
| DESCRIPTION: | Stop the current treatment being applied, if any, on the parked call-leg. | |
| TOKEN: | <PRL> | |
| ARGUMENT: | None | |
| EXAMPLE: | <PRL> | |
| DESCRIPTION: | Release the parked call-leg. | |
| TOKEN: | <UNP> | |
| ARGUMENT: | None | |
| EXAMPLE: | <UNP> | |
| DESCRIPTION: | Send an UNPARK message to the TID that parked the call-leg to retrieve the parked call-leg. | |

The following is an example of methods that can be implemented in response to a status change on a parked call-leg. The methods include the method instruction tokens that have been explained above. Each of the following methods is identified by a method ID, and would comprise a single record or row in method table 364.

| | | |
|---|---|---|
| M01 | COMMENT | Delete the call-leg's info in the CPS database. |
| | INSTRUCTIONS | <DEL> |
| M02 | COMMENT | If the last monitored digit was "*" and the last collected digit was "0", send an unpark message to the client that parked the call-leg. |
| | INSTRUCTIONS | <IFM>*<IFC>0<UNP> |
| M03 | COMMENT | If the last monitored digit was "#" and the last collected digit was "0", send an unpark message to the client that parked the call-leg. |
| | INSTRUCTIONS | <IFM>#<IFC>0<UNP> |
| M04 | COMMENT | Release the parked call-leg |
| | INSTRUCTIONS | <PRL> |
| M05 | COMMENT | Stop any treatment currently being applied to the call-leg. |
| | INSTRUCTIONS | <STR> |
| M07 | COMMENT | Apply audio treatment, wait 10 seconds, and release the parked call-leg. |
| | INSTRUCTIONS | <STR><TAU><WAI>10 <PRL> |
| M12 | COMMENT | Apply silence treatment, wait 15 seconds, and release the parked call-leg. |
| | INSTRUCTIONS | <STR><TSI><WAI>15 <PRL> |
| M17 | COMMENT | Apply tone treatment, wait 20 seconds, and release the parked call-leg. |
| | INSTRUCTIONS | <STR><TTO><WAI>20 <PRL> |
| M18 | COMMENT | Apply audio treatment for indefinite time-period. |
| | INSTRUCTIONS | <STR><TAU> |
| M19 | COMMENT | Apply silence treatment for indefinite time period. |
| | INSTRUCTIONS | <STR><TSI> |
| M20 | COMMENT | Apply tone treatment for indefinite time-period. |
| | INSTRUCTIONS | <STR><FTO> |

With reference now to FIG. 2, a more complete description of each of the processes resident on CPS platform 260 will now be provided. DB process 264 is responsible for maintaining CPS database 360. After start-up processing has been completed, DB process 264 operates exclusively in interrupt mode. This process enters "hibernation" and performs its processing using interrupt processing based on VMS operating system AST (Asynchronous System Trap) interrupt routines.

Changes in the status of parked call-legs are signaled to DB process 264 by AP 140 through the use of a call-leg information table UPDATE request. An UPDATE request indicates what event has occurred that has changed the status of a parked call-leg. DB process 264 determines from the record in call-leg information table 362 for that parked call-leg what method ID, if any, is to be carried out in response to the change in status communicated to it for that parked call-leg in the UPDATE request. A status-change notification is then sent from DB process 264 to PSEL process 266 to initiate execution of the method corresponding to the method ID by agent processes 268.

When a call is initially parked on ACD 120, a message is sent from AP 140 to call park server platform 260 to add a record to call-leg information table 362 that corresponds to the parked call-leg. This is accomplished through the use of an ADD request that is sent to CPS platform 260. Through the use of ADD request, a record corresponding to each parked call-leg is added to call-leg information table 362.

DB process 264 is responsible for "timing" how long call-legs remain parked on an ACD. When a call-leg is parked at an ACD, and a corresponding call-leg information table ADD request is sent to CPS platform 260, part of the information contained in the ADD request is a designation of a maximum time limit that the call-leg may remain parked. This time-out limit is included in the record (Item 8 described above) that is stored in call-leg information table 362 for that parked call-leg. If no time-out limit is provided in the record for a parked call-leg, a default time-out limit is assumed by DB process 264. In a preferred embodiment, DB process 264 activates a separate timer for each record in call-leg information table 362. If a timer for a parked call-leg expires, the call-leg has been parked for the maximum allowable time. At such time, DB process 264 selects the method ID (if any) specified by the parking facility that parked the call-leg that is to be executed in response to a time-out event. The method ID that is to be executed in response to a time-out event would have been specified by the parking facility at the time that the call-leg was parked at the ACD. This information would have been contained in the ADD request sent to CPS platform 260 at the time the call-leg was parked (Item 6 described above). If a method ID was specified to be executed at a time-out event, DB process 264 sends a status-change notification message to PSEL process 266 to instruct it to assign agent process 268 to execute the method specified by the method ID.

DB process 264 also performs a "clean-up" or "purge" operation to eliminate records (rows) that have remained in CPS database 360 for an excessive period of time. In a preferred embodiment, DB process 264 purges call-leg information table 362 of "overdue" records at process start-up and periodically thereafter at pre-determined purge intervals. Preferably, the pre-determined purge interval is one hour. An overdue record refers to those records that correspond to a parked call-leg that has been parked for a parked time period that is longer than a time-out limit that has been set for that parked call-leg, and that is longer than the pre-determined purge interval. In this manner, records can be deleted from call-leg information table 362 that relate to call-legs that are no longer parked, and that have not been deleted by the normal execution of methods or in accordance with delete requests received by CPS database 360.

PSEL process 266 functions as a manager for the various agent processes 268 operating on CPS platform 260. PSEL process 266 is responsible for assigning methods to agent processes 268 in order to service changes in the status of parked call-legs. PSEL process 266 receives a status-change notification message from DB process 264. The status-change notification messages signal PSEL process 266 that a change has occurred on a call-leg that is (or was) parked at an ACD serviced by CPS platform 260, and that a method is to be executed in response to the change in status on that parked call-leg.

PSEL process 266 acquires the status-change notification from DB process 264 via a mailbox initialized during process startup. An AST routine assigned to the mailbox read operation is executed when a status-change notification message arrives in the mailbox. Status-change notifications are "one way" messages from DB process 264 to PSEL process 266; no response is sent from PSEL process 266 to DB process 264. PSEL process 266 selects one of the agent processes 268 to carry out or execute the method corresponding to the method ID specified in a status-change notification message received from DB process 264. PSEL process 266 selects the particular agent process 268 based upon what ACD the call-leg is parked on, and which agent process 268 associated with that particular ACD has the least pending method assignments. When agent process 268 is selected, PSEL process 266 reads method table 364 to determine the instruction text associated with the method ID. PSEL process 266 forms an agent work-order message that includes the method instruction text and the CID of the parked call-leg from the status-change notification message, and sends the agent work-order message to the selected agent process 268. The communication of the work-order message between PSEL process 266 and agent processes 268 is managed by communications/interface process 262, particularly the local or internal communications aspect In a preferred embodiment, the communication between PSEL process 266 and agent processes 268 is handled using an inter-process communication manager disclosed in co-pending application Ser. No. 08/671,027.

In a preferred embodiment of the present invention, there will be two agent processes 268 associated with each ACD served by CPS platform 260. In such an embodiment, PSEL process 266 will alternate task or method assignments between the two agent processes that serve each ACD. In alternate embodiments of the present invention, other numbers of agent processes 268 can be assigned or affiliated with each ACD.

PSEL process 266 preferably maintains an array of addresses that identify each of agent processes 268 that are attached or affiliated with it. When an agent process starts up, it sends an agent-available message to PSEL process 266. Agent-available messages are also re-sent by agent processes 268 in the event that PSEL process 266 terminates and is re-started. The agent-available message identifies what agent processes 268 are available, and to what ACD the particular agent process is assigned. PSEL process 266 records the address of agent process 268, along with the ACD site identifier, for each agent process 268.

Agent processes 268 carry out the method instructions that are assigned to it by PSEL process 266. A particular agent process 268 that is carrying out a method for a parked call-leg will be one of the agent processes that is associated with the ACD on which the call-leg is parked. After the method is carried out by an agent process, the agent process sends an agent-done message to PSEL process 266. The agent-done message notifies PSEL process 266 that the method has been completed. The agent-done message includes the CID of the call-leg for which the method has been carried out, and an indicator of the final result of the method. In a preferred embodiment, the final result has a value of one if the method was carried out and completed in a normal manner. For any other result, the final result has a value of zero.

PSEL process 266 also sequences the execution of the methods to ensure that the methods are carried out in the order in which the triggering events occurred. In a preferred embodiment, PSEL process 266 accomplishes this sequencing function by tracking which agent has been assigned to carry out a method for that CID. If the same CID changes state, and the method for a previous state change on that CID is currently being executed (i.e., is not completed), then PSEL process 266 will route or assign the method corresponding to a subsequent state change for that CID to the same agent process 268 that is currently executing a method for a previous state change on that CID. This ensures that methods are carried out in the same order as the corresponding triggering events occurred. An agent process 268 currently working on a method cannot begin a subsequent method until the previous or prior-in-time one is complete. By having the same agent process execute a prior-in-time method as a subsequent method, the subsequent method cannot be completed before the prior-in-time method.

If the method being carried out by agent process 268 includes a DELETE instruction (instruction token DEL=M01), then the record corresponding to that parked call-leg is to be deleted from call-leg information table 362. However, agent processes 268 cannot directly delete a record from call-leg information table 362. Only DB process 264 can delete a record from call-leg information table 362, as only DB process 264 has read/write authority for CPS database 360. PSEL process 266 has read-only authority with respect to CPS database 360. To delete a record from call-leg information table 362, agent process 268 sends a request to DB process 264 using internal communications managed by communications/interface process 262. In this manner, a method that requires the deletion of a record from call-leg information table 362 is carried out by agent process 268 by making a request of DB process 264.

To carry out a treatment method (such as applying audio treatment, tone treatment, silence treatment, and the like), agent processes 268 instruct the ACD on which the call-leg is parked to actually carry out the treatment. For example, when a method includes applying audio treatment, such as method M06 shown above, agent process 268 sends a message to the ACD on which the call-leg is parked, and instructs it to provide the audio treatment. This message is sent from call park server 160 via communications link 162, and network 170 to AP 140. AP 140 sends the appropriate message to ACD 120 via link 142. The message that is sent from CPS 160 to AP 140 specifies an audio treatment number that corresponds to the type of audio treatment to be applied to the parked call-leg. The audio treatment number is obtained from the record in call-leg information table 362 that corresponds to the parked call-leg. The audio treatment number in the record is specified when the record is initially added to call-leg information table 362 by the parking facility.

To carry out a method that includes a release instruction (instruction token PRL) that releases the parked call-leg, an agent process sends a message to AP 140. AP 140 sends an appropriate message to ACD 120 to release the parked call-leg. When a parked call-leg is released, a parameter is included in the message that gets passed by AP 140 to ACD 120 that indicates the release type. In one type of release, two parties are linked together at a bridging switch and the parking facility (ARU or operator console) is released from the call. In another type of release, the call-leg is disconnected, i.e., there is a hang-up of the parked call-leg. When AP 140 receives a request from one of agent processes 268 to release a parked call-leg, it sends an appropriate message to ACD 120 on which the call-leg is parked to release the parked call-leg. AP 140 also sends a DELETE request to CPS platform 260 to delete the record corresponding to the released parked call-leg from call-leg information table 362. In this manner, call-leg information table 362 is updated so that it no longer contains a record for a call-leg which is no longer parked.

When a call is retrieved by a parking facility, the parking facility regains control over the call. That is, the call-leg is no longer parked at an ACD, and the call-leg is under control and responsibility of an ARU or an operator console. When a parking facility retrieves a parked call-leg, the ACD on which the call-leg is parked notifies AP 140. AP 140 sends a DELETE request to CPS platform 260 to delete the record corresponding to the retrieved parked call-leg from call-leg information table 362. In response to the DELETE request, DB process 264 deletes the corresponding record from call-leg information table 362. In this situation as well, call-leg information table 362 is updated to delete the record for a call-leg which is no longer parked. In this situation, the call-leg has been retrieved by the parking facility rather than being released as discussed above. In both situations, that is, release of a parked call-leg or a call-leg being retrieved, call-leg information table 362 is updated to delete the records corresponding to the retrieved or released parked call-legs.

Figure 4:
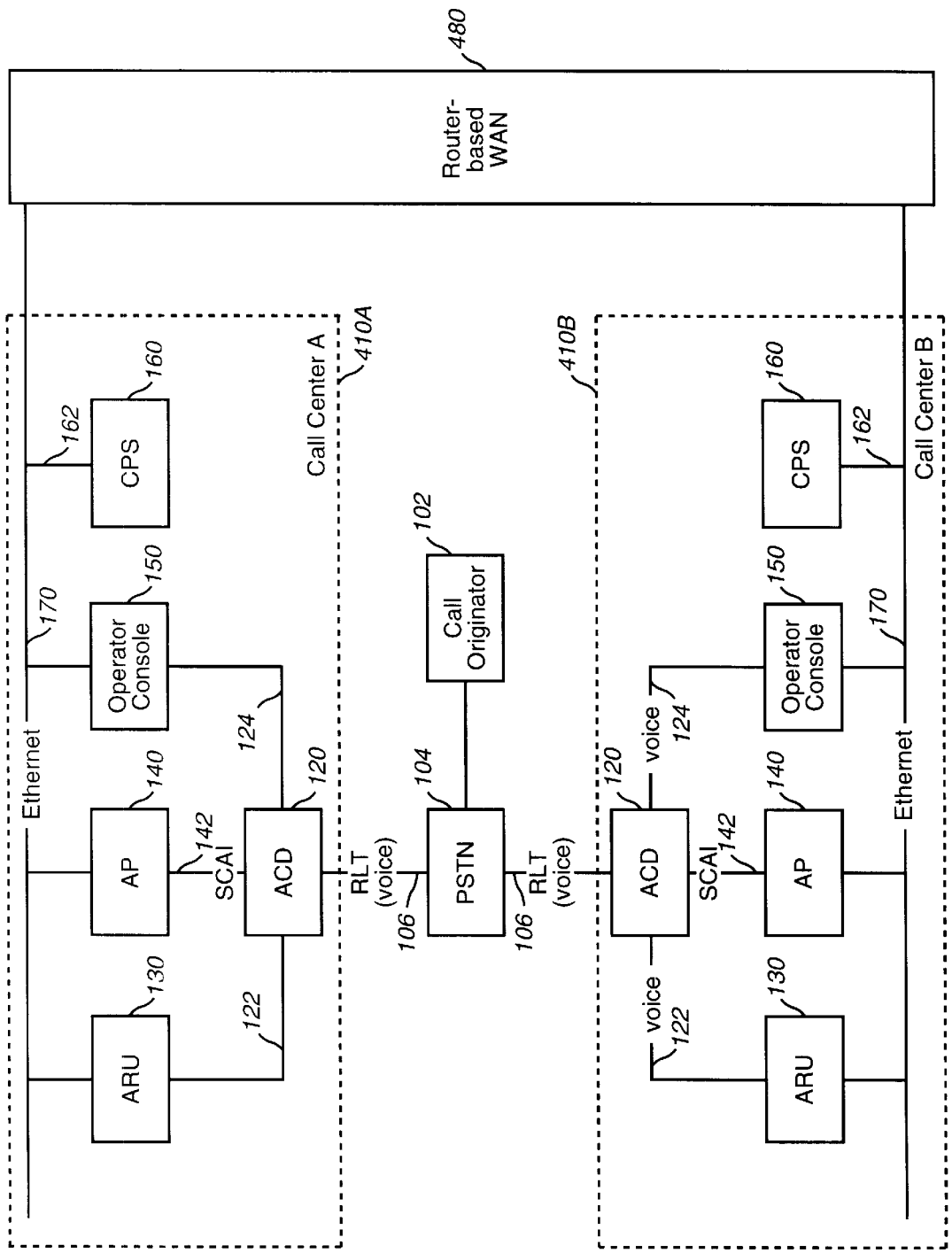
FIG. 4 shows a block diagram of one embodiment of a dual call center architecture.

Turning now to FIG. 4, one embodiment of a dual call center architecture is shown. The present invention is configured to accommodate a primary and secondary architecture to facilitate data-redundancy and fail-over handling.

FIG. 4 shows two call centers, call center A, identified as 410A, and call center B, identified as 410B. Network 170 in call center A is connected to network 170 in call center B via a router-based wide area network (WAN) 480. WAN 480 provides a network so that communications can run from call center A to call center B. The architecture shown in FIG. 4 enables call park server 160 to support more than one ACD 120. As such, call-leg information table 362 includes in the various records an ACD identifier that identifies the particular ACD on which a call-leg is parked.

Figure 5:
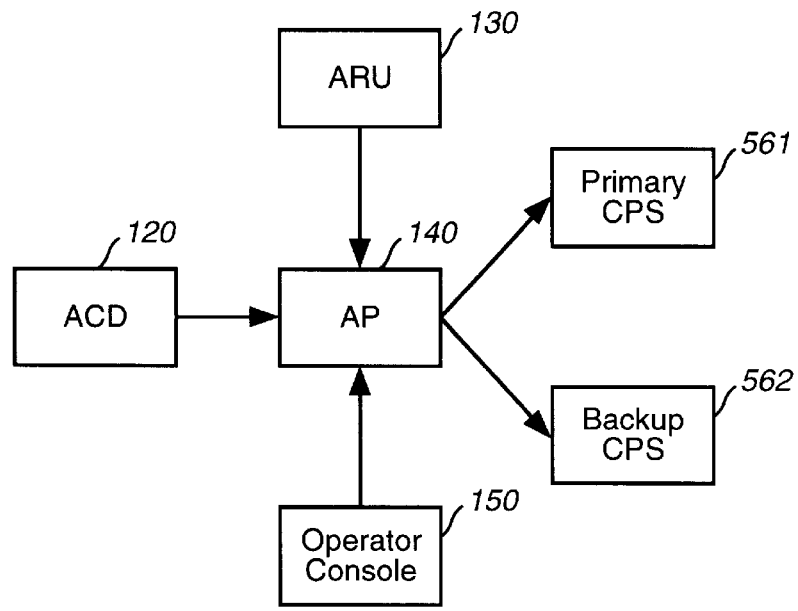
FIG. 5 shows a block diagram of the present invention with primary and backup call-park servers.

Similarly, more than one call park server 160 is used to support a single ACD. In the architecture shown in FIG. 4, each CPS 160 is designated as a primary call park server for one ACD 120 and as a backup or secondary call park server 160 for the other ACD 120. Therefore, each ACD shown in FIG. 4 has a primary CPS 160 and a secondary or backup CPS 160. Method tables 364 in each CPS 160 shown in FIG. 4 are static, and are kept synchronized through the use of common order entry procedures. However, call-leg information table 362 in each CPS 160 are volatile, and change frequently with updates received from AP 140. Call-leg information table 362 of each CPS 160 shown in FIG. 4 are kept synchronized by having AP 140 associated with each ACD 120 send UPDATE requests to both the primary call park server and the secondary or backup call park server. The dual communication required to maintain synchronization is illustrated in FIG. 5. AP 140 simultaneously sends messages to a primary CPS 561 and a backup or secondary CPS 562. Each message that AP 140 sends to primary CPS 561 is also sent to backup CPS 562. In this manner, call-leg information table 362 of primary CPS 561 is maintained to be the same as call-leg information table 362 of backup CPS 562. If one of the primary or backup call park servers should fail, the other call park server can take over with current information in the call-leg information table.

Each message that AP 140 sends to primary CPS 561 and backup CPS 562 has a flag that indicates whether the call park server receiving the message is serving as a primary or as a backup call park server for that application processor (AP). This flag is referred to herein as a primary call park server flag. A call park server that receives an UPDATE request from AP 140 will only execute a method associated with the change in status if the primary call park server flag is set. If the primary call park server flag is not set, then the CPS that receives the UPDATE request from AP 140 will update and store the information in call-leg information table 362, but the method will not be executed. In this manner, the call-leg information tables on each of primary CPS 561 and backup CPS 562 are synchronized, but the method associated with a change in status is only being carried out by one call park server.

In a preferred embodiment, each AP 140 has an assigned primary call park server and an assigned secondary or backup call park server. Such primary and secondary call park servers are preferably located in geographically separate locations so that they are in different time zones. This geographic separation facilitates maintenance in that both primary and secondary call park servers will not be taken down at the same time for scheduled maintenance.

An example of fail-over handling will now be described. When a call-leg is parked on an ACD, a record is added by both the primary and secondary call park servers associated with that ACD. Both the primary and the secondary call park servers will add a record to their respective call-leg information tables that corresponds to the newly parked call-leg. In this example, the primary call park server goes down and drops out before a change in status occurs on the parked call-leg. When a change in status on the parked call-leg does occur, the associated application processor (AP) will get a message from the ACD on which the call-leg is parked, notifying it of the change in status (for example, the # key was hit by the originating party). The application processor upon receiving the message regarding the change in status will detect that its communication link with the primary call park server is down and is no longer there. It will then send an UPDATE message to the secondary call park server. This UPDATE message will have the primary call park server flag set indicating that the secondary call park server is now the primary call park server and responsible for executing methods in response to the change in status that has occurred on the parked call-leg. By setting the primary call-park server flag, the application processor is informing the secondary call park server that it is now the primary call park server and responsible for executing any methods that are required in response to the change in status on the parked call-leg.

As another example, assume that the primary call park server is down so that only the secondary call park server is available. When a facility such as an ARU or operator console parks a call-leg on an ACD, the application processor will send a message to the primary and secondary call park servers to add a record to their respective call-leg information tables to reflect that a call-leg has been parked on the ACD. However, the primary call park server is down, so this record is not being added to the call-leg information table on the primary call park server. If the primary call park server later comes back on-line while the call-leg is still parked on the ACD, it will have no information about that parked call-leg. If a change in status occurs for the parked call-leg after the primary call park server is on-line, the application processor would send an UPDATE message to both the primary and secondary call park servers about the change in status on the parked call-leg. The primary call park server flag would be set for the primary call park server which is now back on-line. However, the primary call park server was down when the call-leg was initially parked on the ACD. The primary call park server in effect does not know that the parked call-leg exists. In this situation, the primary call park server will forward the UPDATE request to the secondary call park server with a request that the secondary call park server act like a primary call park server with respect to the change in status for this parked call-leg. Therefore, the secondary call park server would act like a primary call park server and execute any method that is required in response to the change in status for this parked call-leg.

Figure 6:
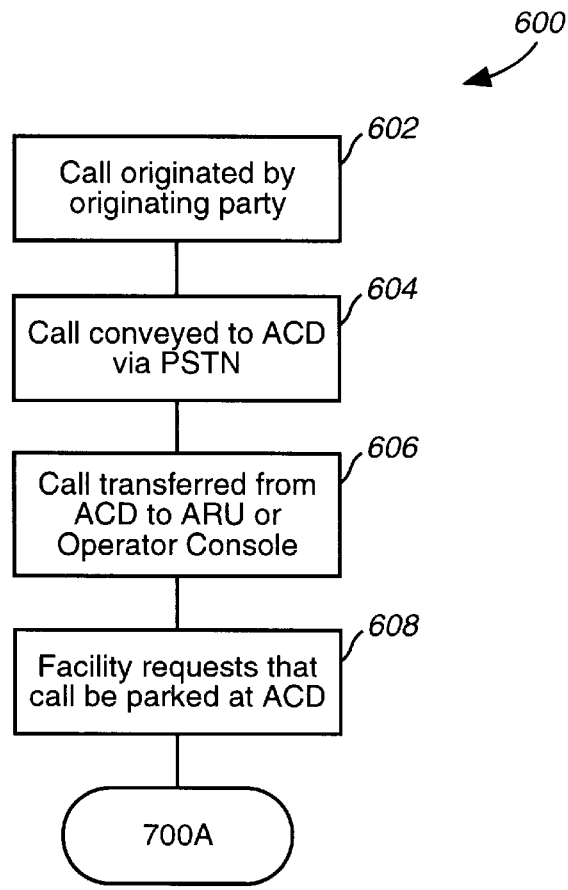
FIG. 6 shows a flow diagram for parking a call on an automatic call distributor (ACD)

With reference now to FIG. 6, a flow diagram 600 for parking a call on an automatic call distributor is shown. In a step 602, a call is originated by an originating party such as call originator 102. In a step 604, the call is conveyed to an ACD via PSTN 104. The call is then transferred from the ACD to an ARU or operator console in a step 606.

In a step 608, a facility requests that the call be parked at the ACD. The facility can be the ARU or operator console. For example, call-legs can be parked at the ACD any time that there is a transfer from an ARU to an operator console, or from an operator console to an ARU. While the call-leg is parked at the ACD, its status will be monitored by call park server 160.

Figure 7A:
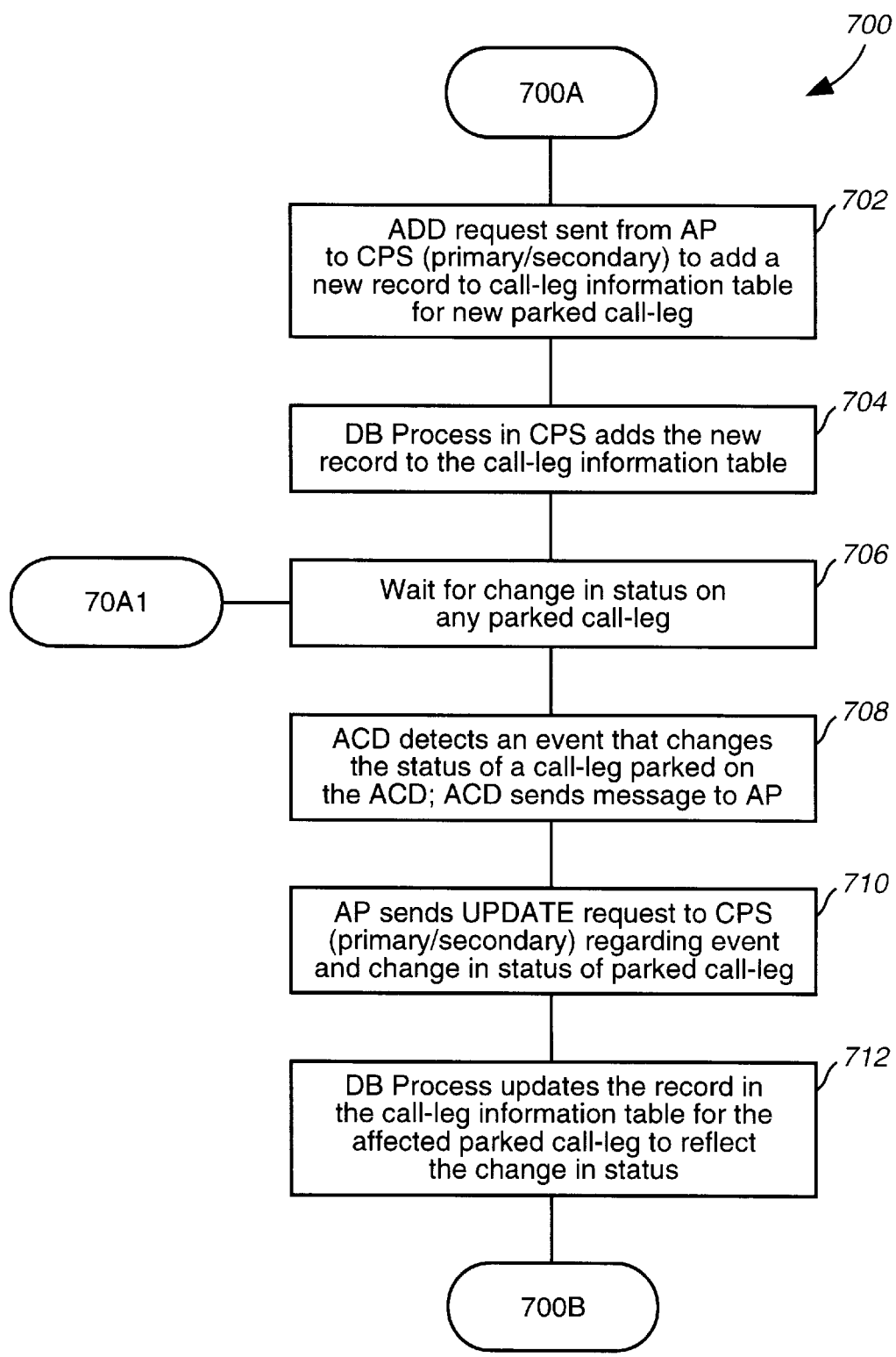
FIGS. 7A, 7B, and 7C show a flow diagram for monitoring parked call-legs, and for executing methods in response to a change in status of the parked call-legs.
Figure 7B:
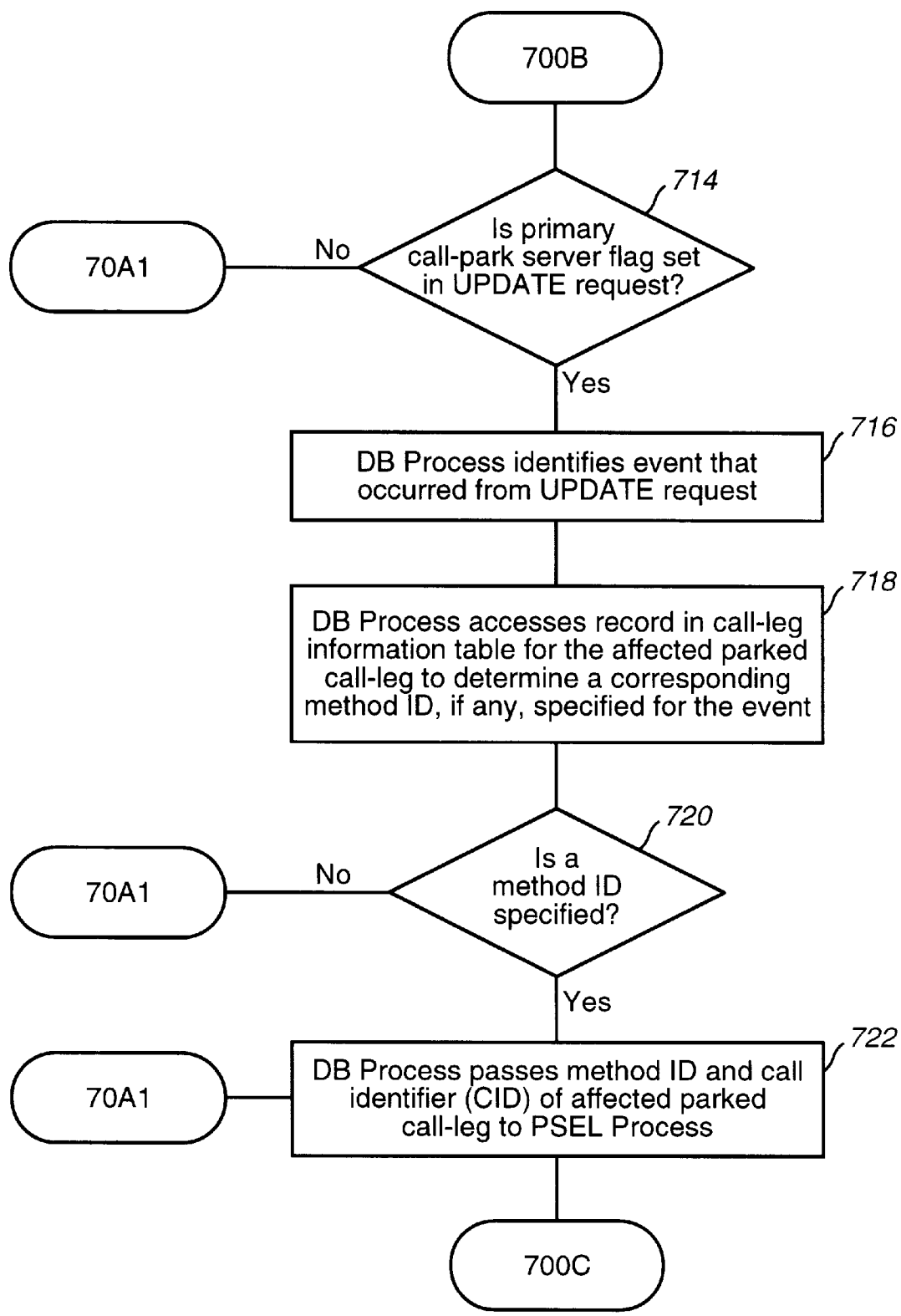
Figure 7C:
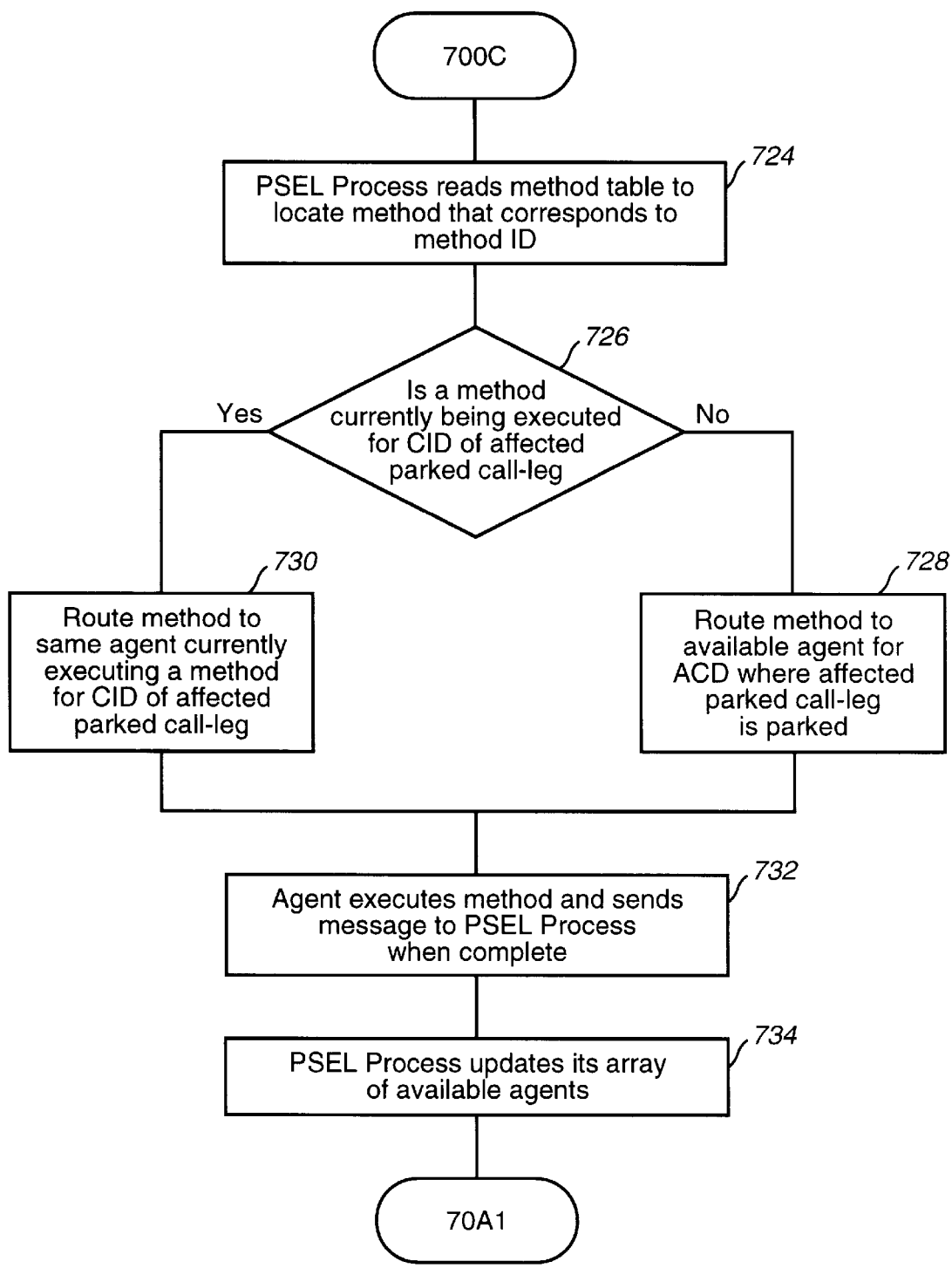

Once the facility requests that the call be parked at the ACD as shown in step 608, then processing continues in a flow diagram 700 shown in FIG. 7A by way of flowchart connector 700A. FIGS. 7A, 7B, and 7C show flow diagram 700 that illustrates monitoring parked call-legs, and for executing methods in response to a change in status of the parked call-legs.

In a step 702, an ADD request is sent from the application processor (AP) to the primary and secondary CPS to add a new record to the call-leg information table for the new parked call-leg. The DB process in each call park server adds the new record to the call-leg information table in a step 704. Each call park server then waits for a change in status on any parked call-leg that is contained in the call-leg information table, as shown in a step 706.

When an event occurs that changes the status of a call-leg parked on an ACD, that ACD detects this event and sends a message to the associated application processor, as shown in a step 708. Such events that are detected by the ACD on which the call-leg is parked can include one or more of the following: a caller hanging up; other means of the call being disconnected from the ACD; a caller entering a designated DTMF signal, such as "0" for an operator; and treatment failure (processing applied by the ACD such as playing a recorded message or a signal). It is to be understood that the present invention is not limited to the foregoing triggering events, and other events may be defined that trigger changes in status of parked call-legs.

In response to the message received from the ACD regarding an event that has triggered a change in status of a park call-leg, the AP sends an UPDATE request to the primary and secondary call park servers regarding the event that has occurred and the change in status of the parked call-leg, as shown in a step 710. In response to the UPDATE request, DB process 264 updates the corresponding record in the call-leg information table for the affected parked call-leg to reflect the change in status, as shown in a step 712. Processing then continues in a step 714 shown in FIG. 7B by way of flowchart connector 700B.

In step 714, DB process 264 determines whether the primary call park server flag is set in the UPDATE request. If the primary call park server flag is not set, then processing returns to step 706 shown in FIG. 7A by way of flowchart connector 70A1.

If the primary call park server flag is set in the UPDATE request, then processing continues to a step 716. In step 716, DB process 264 identifies the event that occurred from the UPDATE request. In a step 718, DB process 264 accesses the record in the call-leg information table for the affected parked call-leg to determine if there is a corresponding method ID specified for the event that has occurred.

In a step 720, it is determined whether a method ID has been specified for the affected parked call-leg for the event that has occurred. If a method ID has not been specified, then processing returns to step 706 by way of flowchart connector 70A1.

If a method ID has been specified, then in a step 722, DB process 264 passes the method ID and the call identifier (CID) of the affected parked call-leg to PSEL process 266. Processing then continues in FIG. 7C at a step 724 by way of flowchart connector 700C.

In step 724, PSEL process 266 reads the method table to locate the method that corresponds to the method ID that has been passed to it by DB process 264. In order to sequence the execution of methods to ensure that they are carried out in the same order as the corresponding triggering events, PSEL process 266 must determine whether a method is currently being executed for the CID of the affected parked call-leg.

In a step 726, PSEL process 266 determines whether a method is currently being executed for the CID of the affected parked call-leg. If a method is currently being executed, then PSEL process 266 routes the method to the same agent currently executing a method for the CID of the affected parked call-leg in a step 730. If a method is not currently being executed, then PSEL process 266 will route the method to an available agent for the ACD where the affected parked call-leg is parked in a step 728. After execution of step 728 or step 730, processing continues in a step 732.

In step 732, agent process 268 executes the method and sends a message to PSEL process 266 when execution of the method is complete. PSEL process 266 then updates its array of available agent processes in a step 734. Processing then returns to step 706 shown in FIG. 7A by way of flowchart connector 70A1.

Implementation of the Present Invention

Figure 8:
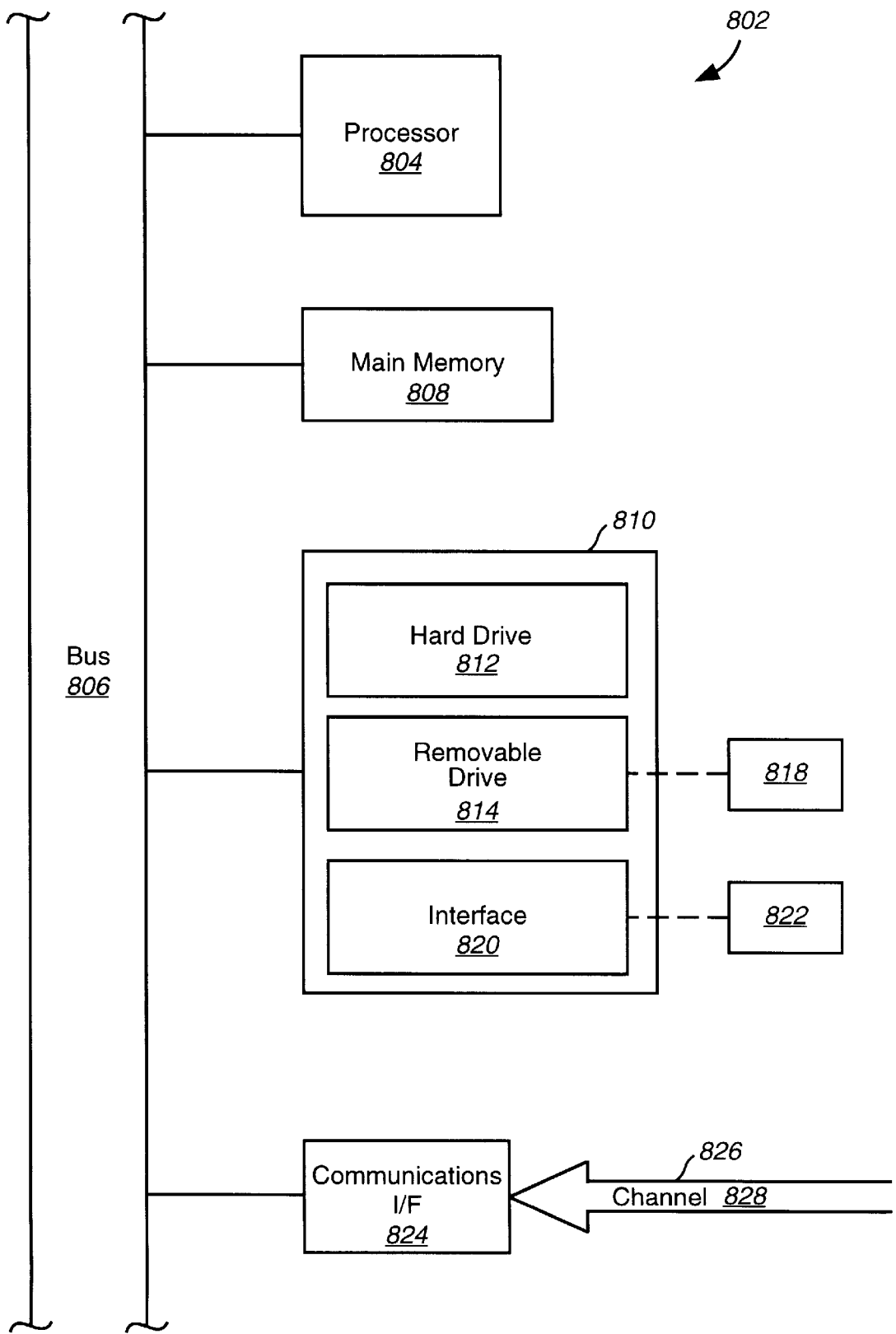
FIG. 8 shows an exemplary computer system suitable for use with the present invention.

The present invention may be implemented using hardware, software or a combination thereof, and may be implemented in a computer system or other processing system. In one embodiment, the present invention is directed toward a computer system capable of carrying out the functionality described herein. An exemplary computer system 802 is shown in FIG. 8. Computer system 802 includes one or more processors, such as processor 804. Processor 804 is connected to a communication bus 806. Various software embodiments are described in terms of this exemplary computer system. After reading this description, it will become apparent to a person skilled in the relevant art how to implement the invention using other computer systems and/or computer architectures.

Computer system 802 also includes a main memory 808, preferably random access memory (RAM), and can also include a secondary memory 810. Secondary memory 810 can include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, removable storage unit 818 includes a computer usable storage medium having stored therein computer software and/or data.

In alternative embodiments, secondary memory 810 may include other similar means for allowing computer programs or other instructions to be loaded into computer system 802. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from removable storage unit 822 to computer system 802.

Computer system 802 can also include a communications interface 824. Commnunications interface 824 allows software and data to be transferred between computer system 802 and external devices. Examples of communications interface 824 can include a modem, a network interface (such as an Ethernet card), a communications port, a PCM-CIA slot and card, etc. Software and data transferred via communications interface 824 are in the form of signals 826 that can be electronic, electromagnetic, optical or other signals capable of being received by communications interface 824. Signals 826 are provided to communications interface via a channel 828. Channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 818, a hard disk installed in hard disk drive 812, and signals 826. These computer program products are means for providing software to computer system 802.

Computer programs (also called computer control logic) are stored in main memory 808 and/or secondary memory 810. Computer programs can also be received via communications interface 824. Such computer programs, when executed, enable computer system 802 to perform the features of the present invention as discussed herein. In particular, the computer programs, when executed, enable processor 804 to perform the features of the present invention. Accordingly, such computer programs represent controllers of computer system 802.

In an embodiment where the invention is implemented using software, the software may be stored in a computer program product and loaded into computer system 802 using removable storage drive 814, hard drive 812 or communications interface 824. The control logic (software), when executed by processor 804, causes processor 804 to perform the functions of the invention as described herein.

In one embodiment, AP 140 is implemented on a DEC Alpha 2100 available from Digital Equipment Corporation, and ARU 130 is implemented on an RS6000 UNIX computer.

CPS 160 is preferably implemented on a multi-user, multi-tasking platform configured to support a relational database. Preferred relational databases include Oracle Rdb and Oracle 7, available from Oracle in Redwood Shores, Calif. In a preferred embodiment, CPS 160 is implemented on a DEC Alpha computer with an Open/VMS operating system, available from Digital Equipment Corporation. Alternatively, CPS 160 can be implemented on a DEC VAX computer with a VMS operating system. In a further alternate embodiment, CPS 160 is implemented as a logical component residing in AP 140, ARU 130 or operator console 150.

As discussed above, communications/interface process 262 preferably provides a UDP/IP communications interface for CPS platform 260. In a preferred embodiment, communications/interface process 262 includes an IP-provider sub-system. Suitable IP-provider sub-systems include the "MultiNet" package available from TGV, Inc., or the "UCX" package available from Digital Equipment Corporation.

A particularly preferred ACD for use with the present invention is a Northern Telecom (NORTEL) DMS-ACD. It should be understood that the present invention is not limited to use with such an ACD, and can be used with other ACDs or other facilities that perform functions analogous to that of an ACD.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s).

In yet another embodiment, the invention is implemented using a combination of both hardware and software.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for monitoring calls parked on one or more automatic call distributors, each parked call having at least one parked call-leg, the method comprising:

(1) maintaining a call-leg information table, wherein said call-leg information table includes a record for each of the parked call-legs;

(2) determining when a change in status has occurred for the parked call-legs, including processing an update request to identify an event that has occurred that changes the status of a parked call-leg;

(3) determining whether said change in status requires a method to be executed, including processing said update request to determine whether a primary call-park server flag is set, and determining from a record in said call-leg information table for said parked call-leg whether a corresponding method is specified for said event; and (4) if said change in status requires a method to be executed, then executing said method.

2. The method of claim 1, further comprising:
(5) maintaining a method table of pre-determined methods that can be executed in response to said change in status of parked call-legs.

3. The method of claim 1, wherein each of said records comprises:
a call identifier for a parked call-leg; and
an automatic call distributor (ACD) identifier for an ACD on which said parked call-leg is parked.

4. The method of claim 3, wherein each of said records further comprises:
a method identifier for identifying a method to be executed in response to a corresponding change in status of said parked call-leg.

5. The method of claim 2, wherein each of said records comprises:
a call identifier for a parked call-leg;
an automatic call distributor (ACD) identifier for an ACD on which said parked call-leg is parked; and
a method identifier for identifying a method to be executed in response to a corresponding change in status of said parked call-leg, wherein said method identifier identifies one of said methods in said method table.

6. The method of claim 4, wherein each of said records further comprises:
a terminal identifier for identifying a facility that parked said parked call-leg;
a flag identifying said parked call-leg as an originating call-leg or a terminating call-leg; and
a time-out limit for defining how long said parked call-leg can remain parked at the ACD.

7. The method of claim 1, wherein step (1) comprises:
(a) processing an add request to add a new record to said call-leg information table for a new parked call-leg; and
(b) processing an update request to update said new record when a change in status occurs for said new parked call-leg.

8. The method of claim 7, wherein step (1) furthers comprises:
(c) processing a delete request to delete an existing record from said call-leg information table.

9. The method of claim 1, wherein said corresponding method is executed only if said primary call-park server flag is set.

10. The method of claim 1, wherein said change in status comprises detection of a designated dual tone multiple frequency (DTMF) signal.

11. The method of claim 1, wherein said change in status comprises disconnection of a parked call from an automatic call distributor on which it is parked.

12. The method of claim 1, wherein said change in status comprises completion of treatment on a parked call-leg.

13. The method of claim 1, wherein said change in status comprises expiration of a time-out timer that monitors how long a parked call-leg is parked on an automatic call distributor.

14. The method of claim 1, wherein step (4) comprises:
(a) applying a treatment to a parked call-leg parked at an automatic call distributor (ACD); and then (b) releasing said parked call-leg from the ACD.

15. The method of claim 14, wherein said treatment is selected from the group consisting of audio treatment, tone treatment, and silence treatment.

16. The method of claim 1, further comprising:
(5) deleting from said call-leg information table a designated number of overdue records, wherein each of said overdue records corresponds to a parked call-leg that has been parked for a parked time period that is longer than a time-out limit for said parked call-leg and that is longer than a pre-determined purge interval.

17. The method of claim 1, wherein step (4) comprises:
(a) sending a message to a parking facility that parked a parked call-leg to retrieve the parked call-leg.

18. A system for monitoring calls parked on one or more automatic call distributors, each parked call having at least one parked call-leg, the system comprising:
call-leg table means for maintaining a call-leg information table, wherein said call-leg information table includes a record for each of the parked call-legs;
method table means for maintaining a method table of pre-determined methods that can be executed in response to a change in status of parked call-legs;
status change means for determining when a change in status has occurred for the parked call-legs, and for determining whether said change in status requires a method to be executed, said status change means includes processing means for processing an update reguest to identify an event that has occurred that changes the status of a parked call-leg and to determine whether a primary call-park server flag is set, and determining means for determining from a record in said call-leg information table for said parked call-leg whether a corresponding method is specified for said event; and
method executing means for executing said method if said change in status requires said method to be executed.

19. The system of claim 18, wherein said method executing means comprises:
sequence means for controlling execution of a sequence of methods on a parked call-leg, said sequence of methods corresponding to a sequence of events that change the status of said parked call-leg, wherein said sequence means ensures that said sequence of methods is executed in an order that is the same as an order of occurrence of said sequence of events.

20. The system of claim 18, wherein said method executing means executes said corresponding method only if said primary call-park server flag is set.

21. The system of claim 18, wherein said method executing means comprises:
unpark means for sending a message to a parking facility that parked a parked call-leg to retrieve the parked call-leg.

22. A computer program product comprising a computer useable medium having computer program logic recorded thereon for enabling a processor in a computer system to monitor calls parked on one or more automatic call distributors, each parked call having at least one parked call-leg, said computer program logic comprising:
database means for enabling the processor to maintain a database comprising a call-leg information table that includes a record for each of the parked call-legs, and a method table of pre-determined methods that can be executed in response to a change in status of parked call-legs, said database means including event means for enabling the processor to process an update request to identify an event that has occurred that changes the status of a parked call-leg, primary call-park server means for enabling the processor to process said update request to determine whether a primary call-park server flag is set, and method determining means for enabling the processor to determine from a record in said call-leg information table for said parked call-leg whether a corresponding method is specified for said event; and method executing means for enabling the processor to execute methods in response to changes in status of parked call-legs.

23. The computer program product of claim 22, wherein said method executing means comprises:

sequence means for enabling the processor to control execution of a sequence of methods on a parked call-leg, said sequence of methods corresponding to a sequence of events that change the status of said parked call-leg, wherein said sequence means ensures that said sequence of methods is executed in an order that is the same as an order of occurrence of said sequence of events.

24. The computer program product of claim 22, wherein said database means comprises:

add means for enabling the processor to process an add request to add a new record to said call-leg information table for a new parked call-leg;

update means for enabling the processor to process an update request to update said new record when a change in status occurs for said new parked call-leg; and delete means for enabling the processor to delete an existing record from said call-leg information table.

25. The computer program product of claim 22, wherein said method executing means enables the processor to execute said corresponding method only if said primary call-park server flag is set.

26. The computer program product of claim 22, wherein each of said records comprises:

a call identifier for a parked call-leg;

an automatic call distributor (ACD) identifier for an ACD on which said parked call-leg is parked; and a method identifier for identifying a method to be executed in response to a corresponding change in status of said parked call-leg, wherein said method identifier identifies one of said methods in said method table.

27. The computer program product of claim 22, wherein said method executing means comprises:

unpark means for enabling the processor to send a message to a parking facility that parked a parked call-leg to retrieve the parked call-leg.

* * * * *